United States Patent
Olvera-Hernandez et al.

(10) Patent No.: US 7,245,921 B2
(45) Date of Patent: Jul. 17, 2007

(54) CHANNEL RESERVATION IN A LOCATION AREA

(75) Inventors: Ulises Olvera-Hernandez, Quebec (CA); Andrew Forde, Dublin (IE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 249 days.

(21) Appl. No.: 10/311,588

(22) PCT Filed: Jul. 17, 2001

(86) PCT No.: PCT/EP01/08239

§ 371 (c)(1),
(2), (4) Date: Jun. 12, 2003

(87) PCT Pub. No.: WO02/07469

PCT Pub. Date: Jan. 24, 2002

(65) Prior Publication Data

US 2004/0009765 A1 Jan. 15, 2004

(30) Foreign Application Priority Data

Jul. 17, 2000 (GB) .................................. 0017539.8

(51) Int. Cl.
*H04Q 7/20* (2006.01)
*H04Q 7/38* (2006.01)
(52) U.S. Cl. ............... 455/452.1; 455/450; 455/452.3; 455/509; 455/512; 455/422.1; 455/403; 455/435.1; 370/343; 370/328
(58) Field of Classification Search .............. 455/450, 455/452.1, 452.3, 453, 509, 512, 422.1, 426.1, 455/432.1, 436–443, 500, 517, 550.1, 403, 455/451, 435.1, 435.3; 370/343, 328
See application file for complete search history.

(56) References Cited

U.S. PATENT DOCUMENTS

| 5,530,912 | A | * | 6/1996 | Agrawal et al. ............ 455/450 |
| 5,574,977 | A | | 11/1996 | Joseph et al. |
| 5,862,485 | A | | 1/1999 | Linneweh, Jr. et al. |
| 6,009,331 | A | | 12/1999 | Ueda |
| 6,169,898 | B1 | * | 1/2001 | Hsu et al. ................ 455/432.3 |
| 6,178,164 | B1 | * | 1/2001 | Wang et al. ................ 370/331 |
| 6,192,248 | B1 | * | 2/2001 | Solondz ...................... 455/450 |
| 6,678,526 | B1 | * | 1/2004 | Sugirtharaj ................. 455/450 |
| 6,721,278 | B1 | * | 4/2004 | Rimhagen et al. .......... 370/252 |
| 2004/0058695 | A1 | * | 3/2004 | Ji et al. ...................... 455/500 |

FOREIGN PATENT DOCUMENTS

| EP | 0973352 A2 | 1/2000 |
| EP | 0973352 A3 | 1/2000 |
| WO | WO99/67969 | 12/1999 |

* cited by examiner

*Primary Examiner*—Keith Ferguson
(74) *Attorney, Agent, or Firm*—Michael Cameron, Esq.

(57) ABSTRACT

There is described a mobile cellular telephone system, in which channels can be reserved dynamically, in each cell of the system. A locating area can be defined for a specific class of customer, and a channel can be reserved for that customer in each cell covered by the locating area, for as long as the customer remains active in that area. For example the locating area can be a Virtual Mobile Locating Area (VMLA).

13 Claims, 2 Drawing Sheets

CHANNEL RESERVATION IN A LOCATION AREA

FIELD OF THE INVENTION

This invention relates to a mobile communications system, and in particular to a method of reserving channels for use in such a system, as well as unreserving channels where such reservation is no longer necessary.

BACKGROUND OF THE INVENTION

A mobile telecommunications system, such as a cellular telephone system, provides air interface channels over which a user can communicate. In the case of a conventional cellular telephone system, a user communicates over a radio channel with a base station, which then connects the user to another party. The type of channels which are used depends on the telephone system. For example, the GSM system uses a hybrid TDMA (Time Division Multiple Access) and FDMA (Frequency Division Multiple Access) scheme, in which each channel represents a particular time slot, that is, a regularly recurring time interval, on a specific one of the many frequencies allocated for traffic.

A feature common to all such communications systems is that the total number of available channels is far smaller than the total number of subscribers who could theoretically make calls. Network operators must decide how many channels to make available in each geographical area, given that there is a cost associated with providing such channels.

This means that, when a user wishes to communicate over a channel, there is a possibility that there will be no channel available for such use. Clearly, this is inconvenient for the user.

It is advantageous for the network operator to provide the best possible service to certain favoured users or categories of users, for example those users who make frequent use of the service, thus providing high revenues for the network operator, or those users who are prepared to pay higher charges in return for a higher guaranteed grade of service. Thus, it is advantageous for the network operator to have a tool which minimises the possibility that such a user will find no channel available when he wishes to use the system.

For that purpose, it is known to reserve in each cell a group of channels, specifically for use by favoured users. This is described in the existing IS-136 standard.

However, this has the limitation that the reserved channels are unavailable for use by other users, even if no favoured users are active in the area, while the number of reserved channels may be inadequate if there is a high number of active favoured users.

SUMMARY OF THE INVENTION

According to one preferred aspect of the invention, one or more channels is reserved for use by users from a predetermined group, namely the favoured users. In accordance with the invention, the number of channels reserved in this way is varied, depending upon the number of active users who may be in a position to access the channels.

This has the advantage that the number of reserved channels can be set to a level which is appropriate to the relevant number of active users at a given time.

Specifically, one aspect of the present invention provides a method of operating a cellular mobile radiocommunications system, the method comprising:

determining whether a registered mobile station is in a specific class; and, if so:
defining a locating area for the registered mobile station, the locating area covering one or more cells; and
determining a number of channels to be reserved for mobile stations in the specific class, in each cell of the network, depending on the number of registered mobile stations having locating areas covering the respective cells.

Another aspect of the invention provides a network operating in accordance with the methods of the first aspect.

This has the advantage that the number of reserved channels can be determined dynamically, depending upon the number of mobile stations actually active at any given time.

DETAILED DESCRIPTION OF PREFERRED EMBODIMENTS

The invention will now be described with reference to its implementation in a digital cellular radiotelecommunications system, in particular a system operating under the IS-136 air interface standard known as D-AMPS.

Figure 1:
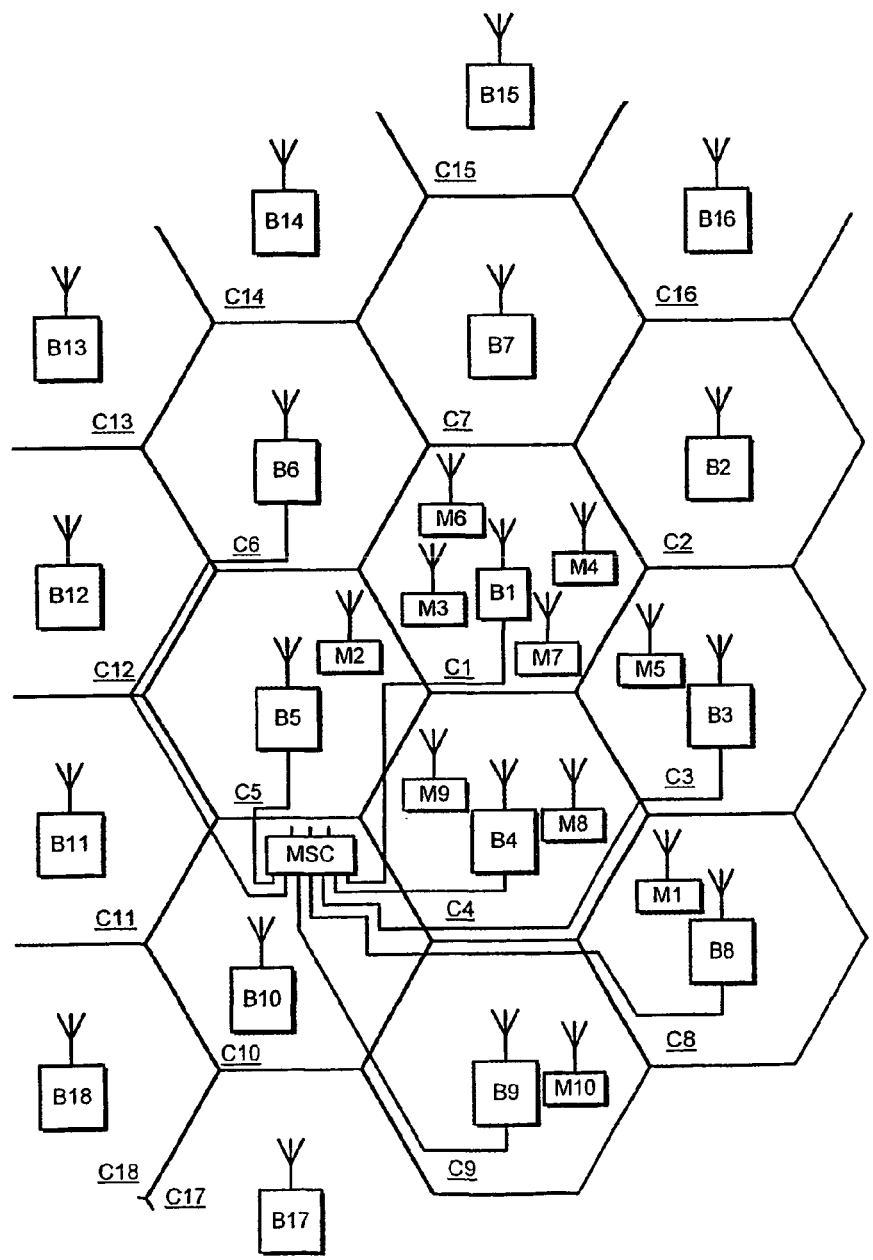
FIG. 1 is a schematic representation of a network using the invention.

FIG. 1 is a schematic representation of a part of a cellular network as used in such a system. FIG. 1 shows eighteen cells C1-C18, although it will be. appreciated that the complete network includes many more cells than this. Each cell C1-C18 includes a respective base station B1-B18, located near the centre of the respective cell, and having an omnidirectional antenna. It will be appreciated that, instead, base stations may be located near the borders between cells, and may have directional antennas. The antenna of a base station may send or receive traffic-carrying signals, or control signals or other information.

FIG. 1 also shows a mobile switching centre MSC, which is connected by cables to all of the base stations B1-B18, and is also connected to a fixed telephone network such as a PSTN or ISDN. Not all of these cables are shown in FIG. 1, and, indeed, communications between the base stations and the mobile switching centre MSC may be made in other ways, for example over fixed radio links.

FIG. 1 also shows ten of the mobile stations M-M10 used by subscribers to the network. These mobile stations are moveable throughout the area covered by the network.

The network is able to operate on a number of operating frequencies, used to provide channels over which communications may be made. However, the number of available channels is very much smaller than the number of users in the network. Moreover, in each cell, the number of available channels is further considerably reduced, since the same channel frequency cannot be used simultaneously in two nearby cells, in order to avoid or reduce the possibility of interference.

As is well known, when a mobile station moves around in the network for example between cells, it may need to handover communications from one base station to another, and thereby change its channel frequency. In order for the system to have information as to whether such a handover would be desirable, each mobile station makes signal strength measurements, not only on the channel on which it is presently operating, but also on channels associated with other cells. The mobile then sends measurements to the network at intervals. This procedure is known as mobile assisted handover (MAHO).

In the example shown in FIG. 1, the base station B1 sends messages to the mobile stations, M3, M4, M6 and M7, operating within the cell C1, instructing them to take measurements (which might, for example, be signal strength measurements or some other measurements indicating signal quality), on the frequencies of operation of the cells which border the cell C1. These cells are defined within the system as neighbouring cells.

In a somewhat similar way, it is known in systems which use the IS-136 air interface to define for each mobile station a Virtual Mobile Locating Area (VMLA). The IS-136 standard describes this function.

The operation of such a system is that, whenever a mobile station first registers in a network, for example on being switched on, a VMLA is defined for that mobile station, consisting of a cluster of neighbouring cells, centred on the cell in which it is currently located. For example, in the example of FIG. 1, if mobile station M3 registers in cell C1, the defined may consist of cell C1 and the six surrounding cells C2-C7. The mobile is informed of the defined VMLA.

When the mobile station roams outside the defined VMLA, it must reregister. Thus, for example, if mobile station M3 leaves its defined VMLA by travelling into cell C10, it must reregister. The system will then define a new VMLA centered on cell C10. The new VMLA may for example consist of cell C10 and its six surrounding cells, namely cells C4, C5, C9, C11, C17 and C18. Thus, some of the cells from the old VMLA are also contained in the new VML.

Thus, the use of VMLAs, as described above, allows the system to keep track of the progress of a mobile station through the network.

The preferred embodiment of the present invention, described below, also uses the VMLA of a mobile station belonging to a user in a specific class, in connection with the reservation of channels for that user, and for other users in the class.

Figure 2:
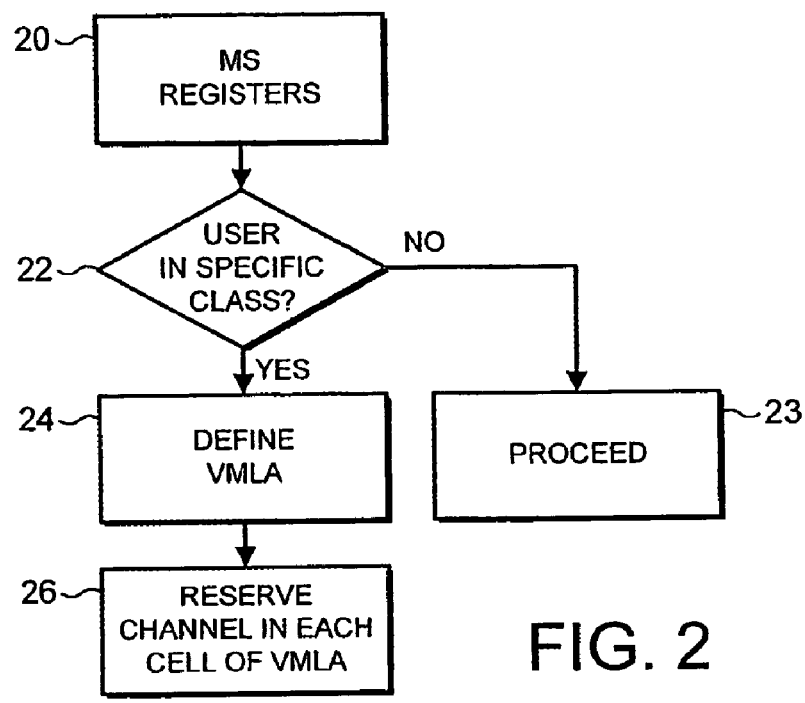
FIG. 2 is a flow chart illustrating a part of a method in accordance with the invention.

FIG. 2 is a flow chart showing a part of the operation of the network in implementing the invention.

In step 20 of the procedure of FIG. 2, a mobile station registers with the network. For example, this may occur when the mobile station user switches on his phone.

In step 22, the network determines whether the mobile station user is a user in a specific class, to which the invention is to be applied. For example, the network may check the VLR (Visitor Location Register), a database containing subscriber information, to determine whether the user is in the specific class. The specific class may comprise those users which are determined by the network operator to be deserving of especially favourable treatment. For example, the specific class may comprise users who generate high revenues for the network operator and/or those users who pay a higher charge in return for a higher grade of service.

It should be noted that even users who may otherwise be in the specific class are not considered to be in the specific class while they are engaged on a call. That is, no channel is reserved for a user who is already occupying a channel.

If the user is not in the specific class, the process passes to step 23, and the call proceeds in the normal way, which is not described further.

If the user is in the specific class, the process passes to step 24, in which the network defines a Virtual Mobile Locating Area (VMLA) for the registered mobile station. As described above, this can advantageously comprise the cell in which the user is located, plus the neighbouring cells.

In step 26, the network reserves a traffic channel, in each cell of the VMLA, for the user. Specifically, it is known in systems which use the IS-136 air interface to define for each cell a Reserved Channel Counter. Again, the IS-136 standard describes this function. In step 26, the value of this counter is incremented by one.

In fact, the system may define a maximum value for the value of the Reserved Channel Counter, to set an upper limit on the number of channels which may be reserved. However, it is envisaged that this limit will be reached only infrequently.

The result is that, when another user not belonging to the specific class wishes to make a call, the number of available channels is compared with the value of the Reserved Channel Counter. Unless the number of available channels is greater than the number of reserved channels, the call attempt may be rejected, unless the user wishing to make the call meets specific criteria.

Other than this, the use of the network by users not in the specific class continues unaffected.

Figure 3:
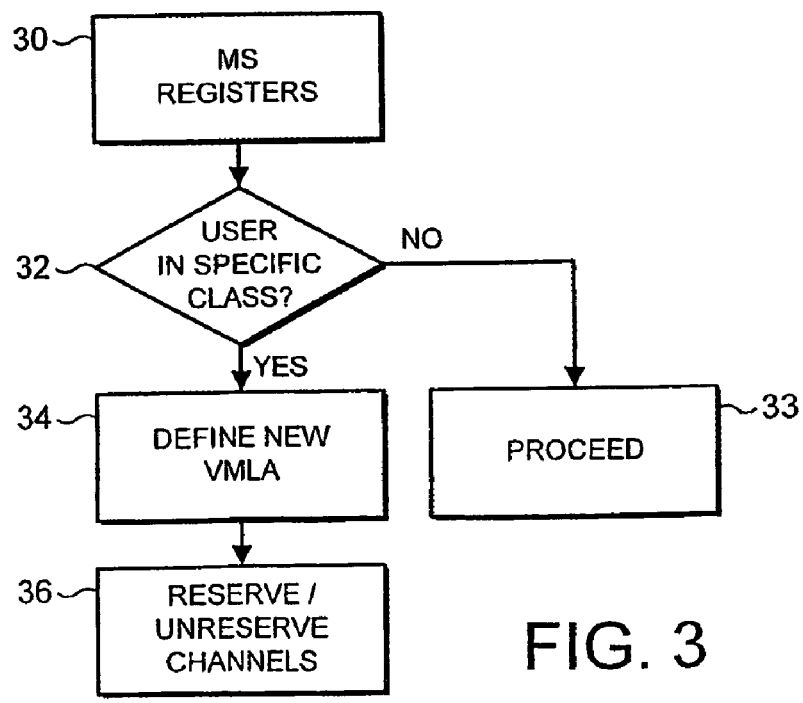
FIG. 3 is a flow chart illustrating another part of a method in accordance with the invention.

FIG. 3 is a further flow chart showing an other part of the operation of the network in implementing the invention. Specifically, FIG. 3 illustrates the procedure when a mobile station belonging to the specific class has registered with the network as described above with regard to FIG. 2, and then leaves the defined VMLA.

In step 30 of the procedure of FIG. 3, the mobile station reregisters with the network. For example, this may occur when the mobile station user leaves the previously defined VMLA.

In step 32, the network determines whether the mobile station user is a user in the specific class, to which the invention is to be applied. As before, the network may check the VLR, to determine whether the user is in the specific class.

If the user is not in the specific class, the process passes to step 33, and the call proceeds in the normal way, which is not de scribed further.

If the user is in the specific class, the process passes to step 34, in which the network defines a new Virtual mobile Locating Area (VMLA) for the registered mobile station, and sends details of this to the mobile station. As described above, the VMLA can advantageously comprise the cell in which the user is located, plus the neighbouring cells.

In step 36, the network reserves a traffic channel, in each cell of the new VMLA, for the user. Equally importantly, for the efficient use of network resources, the network unreserves traffic channels which were previously reserved, but which are now no longer needed.

Specifically, in cells which are in the new VMLA but were not in the previous VMLA, the count value of the Reserved Channel Counter is increased by one. Conversely, in cells which are not in the new VMLA but were in the previous VMLA, the count value of the Reserved Channel Counter is decreased by one.

Thus, the preferred embodiment of the present invention uses the VMLA of a mobile station belonging to a user in a specific class, in connection with the reservation of channels for that user, and for other users in the class, in each cell of the VMLA. However, the invention can also be applied to any system in which there is a mechanism for locating the user. For example, the position of a mobile station in a network area can be monitored by means of: algorithms which utilise last call attempt data and/or termination data; location area registration; system initiated paging; and certain statistical measurements, such as periodic registration, although it should be appreciated that these are only illustrative of the available methods.

In general, the method according to the invention can dynamically reserve a channel, for a user in the specific class, in at least one cell within a locating area associated with the user, however that locating area is determined.

If the locating area is closely defined, then reserving a channel in each cell within the locating area requires the allocation of few channels, but there is a higher load on the system, in terms of the number of changes which must be made to the channel reservations and unreservations. On the other hand, if the locating area is more loosely defined, then reserving a channel in each cell within the locating area requires the allocation of more channels, but against that there is a smaller load on the system.

In the extremes, a closely defined locating area could be as small as one cell, while a loosely defined locating area could be the whole system, with a channel being reserved in every cell for every mobile station which has registered in the system.

The size of the locating area can be set on the basis of other parameters. For example, if the average. cell size is small, or a particular mobile station is moving at high speed, there will tend to be a higher load on the system, in terms of the number of changes which must be made to the channel reservations and unreservations Therefore, it may be advantageous to define a larger locating area, either in that part of the network, or for that particular mobile station, than in other situations. If the network has information about the position and speed of a mobile station, then it is possible to define a locating area for that mobile station which includes cells towards which the mobile station is travelling.

The use of a VMLA as the locating area is presently seen as a good compromise between these two extremes, in particular because, whenever the mobile station reregisters, either by forced registration or by periodic registration, a new VMLA is centered on the cell in which the mobile station is located. This means that the load on the system is reduced.

The method described with reference to FIGS. 2 and 3 involves reserving one channel in every cell of the locating area for every user in a specific class. However, especially where the locating areas are large, it may be acceptable to reserve such channels in some other ratio, for example, reserving one channel in a cell for every two (or three, etc) users in the specific class whose locating areas cover the cell. In this case, the network can reserve a number of channels in a given cell which depends on the number of registered mobile stations in the specific class, whose locating areas cover the cell.

It should be noted that, although the invention has been described above with reference to its applicability in systems operating under the IS-136 standard, the invention is not limited to such systems.

What is claimed is:

1. A method of operating a cellular mobile radio communications system, said radio communication system including a plurality of radio cell areas, the method comprising:
   registering a mobile station within said radio communication system;
   determining whether said registered mobile station is in a specific class; and, if so:
   defining a virtual locating area for the registered mobile station, the virtual locating area comprising a cell in which the registered mobile station is located, plus one or more neighbouring cells within said radio communications system; and
   reserving a traffic channel in each cell at the same time in the virtual locating area, said reserved traffic channel reserved to be used by said registered mobile station only while the mobile station remains in the virtual locating area.

2. A method as claimed in claim 1, wherein the virtual locating area is a Virtual Mobile Locating Area (VMLA), comprising said cell in which the registered mobile station is located, plus a plurality of neighbouring cells.

3. A method as claimed in claim 1, wherein the virtual locating area comprises said cell in which the registered mobile station is located, plus that cell's list of neighbouring cells.

4. A method as claimed in claim 1, comprising setting an upper limit on the number of traffic channels which may be so reserved based on the specific class.

5. A method as claimed in claim 1, further comprising, when the mobile station leaves the defined virtual locating area:
   defining a new virtual locating area for the mobile station;
   reserving a traffic channel in each cell at the same time in the new virtual locating area but not in the originally defined virtual locating area; and
   unreserving a traffic channel in each cell in the originally defined virtual locating area but not in the new virtual locating area.

6. A method as claimed in claim 1, further comprising, when the mobile station leaves a first cell and enters a second cell within the virtual locating area, maintaining existing traffic channel reservations.

7. A method of operating a cellular mobile radio communications system, said system including a plurality of radio cells, the method comprising:
   defining a virtual locating area for a particular registered mobile station, the virtual locating area comprising a cell in which the registered mobile station is located, plus one or more neighbouring cells;
   determining whether said registered mobile station is in a specific class; and,
   if so: reserving a traffic channel in each cell at the same time in the virtual locating area for said registered mobile station; and
   unreserving said traffic channel if the registered mobile station leaves the defined virtual locating area.

8. A method as claimed in claim 7, wherein virtual locating area is a Virtual Mobile Locating Area (VMLA), comprising said cell in which the registered mobile station is located, plus a plurality of respective neighbouring cells.

9. A method as claimed in claim 7, wherein the virtual locating area comprises said cell in which the registered mobile station is located, plus that cell's list of neighbouring cells.

10. A method as claimed in claim 7, comprising setting an upper limit on the number of traffic channels which may be reserved in this way in each cell based on the specific class.

11. A cellular mobile radio communications system, said radio communications system including a plurality of radio cells, comprising:
   means for determining whether a registered mobile station is in a specific class;
   means for defining a virtual locating areas for the registered mobile station in said specific class, said virtual locating area comprising a cell in which the registered mobile station is located, plus one or more neighbouring cells; and means for reserving a traffic channel for said registered mobile station in said specific class in each cell at the same time in the virtual locating area, only while said mobile station remains in the virtual locating area.

12. The cellular mobile radio communications system of claim 11, wherein the virtual locating area is a Virtual Mobile Location Area (VMLA), comprising said cell in which the registered mobile station is located plus a plurality of neighbouring cells.

13. The cellular mobile radio communications system of claim 11 wherein said means for reserving said traffic channel within said cell comprises setting an upper limit on the number of traffic channels which may be so reserved for said mobile station based on the specific class.

* * * * *

UNITED STATES PATENT AND TRADEMARK OFFICE
CERTIFICATE OF CORRECTION

PATENT NO. : 7,245,921 B2 Page 1 of 1
APPLICATION NO. : 10/311588
DATED : July 17, 2007
INVENTOR(S) : Olvera-Hernandez et al.

It is certified that error appears in the above-identified patent and that said Letters Patent is hereby corrected as shown below:

In Column 2, Line 50, delete "M-M10" and insert -- M1-M10 --, therefor.

Signed and Sealed this

Tenth Day of June, 2008

JON W. DUDAS
*Director of the United States Patent and Trademark Office*